United States Patent [19]

Wyler

[11] 4,162,486
[45] Jul. 24, 1979

[54] ENCODED ELECTRICAL CONTROL SYSTEMS

[75] Inventor: Leopold S. Wyler, Beverly Hills, Calif.

[73] Assignee: TRE Corporation, Beverly Hills, Calif.

[21] Appl. No.: 757,632

[22] Filed: Jan. 7, 1977

Related U.S. Application Data

[62] Division of Ser. No. 660,686, Feb. 23, 1976, Pat. No. 4,141,332.

[51] Int. Cl.² .................................. H04M 11/04
[52] U.S. Cl. .................... 340/310 A; 340/310 CP; 340/206; 307/31; 307/40; 343/225
[58] Field of Search ........... 340/310 A, 310 CP, 206, 340/151, 152 R; 307/10 R, 252 B, 31, 32, 40; 315/159, 82, 291; 343/225; 364/492

[56] References Cited

U.S. PATENT DOCUMENTS

| | | | |
|---|---|---|---|
| 3,488,632 | 1/1970 | Clark | 340/310 A |
| 3,558,902 | 1/1971 | Casey | 340/310 A |
| 3,689,886 | 9/1972 | Durkee | 340/310 A |
| 3,810,096 | 5/1974 | Kabat et al. | 340/310 CP |
| 3,818,481 | 6/1974 | Dorfman et al. | 340/310 CP |
| 3,964,047 | 6/1976 | Antonaccio | 340/310 A |
| 4,007,458 | 2/1977 | Hollabaush | 340/310 A |

Primary Examiner—John W. Caldwell, Sr.
Assistant Examiner—Donnie L. Crosland
Attorney, Agent, or Firm—Spensley, Horn, Jubas & Lubitz

[57] ABSTRACT

Encoded electrical control systems for household applications each employ an encoder/transmitter that provides an encoded signal and a receiver/decoder which effectuates control of an associated device only upon receipt of a signal containing the code unique to that specific receiver/decoder.

For household applications, a separate receiver/decoder, each having its own recognition code, is associated with each power outlet or electrical device to be controlled. A common controller includes an encoder/transmitter and a control switch for each device, along with means such as an rf carrier source and modulator, for transmitting all the encoder/transmitter outputs over the electrical distribution system. When a particular switch is actuated, the associated encoder/transmitter sends a signal containing the code of the corresponding receiver/decoder, which in turn effectuates the intended control function.

3 Claims, 9 Drawing Figures

ENCODED ELECTRICAL CONTROL SYSTEMS

This is a division of application Ser. No. 660,686, filed Feb. 23, 1976, now U.S. Pat. No. 4,141,332.

BACKGROUND OF THE INVENTION

1. Field of the Invention

The present invention relates to encoded remote electrical control systems, and partcularly and to systems for the remote control of power outlets, light fixtures and other devices on a common electrical distribution system.

2. Description of the Prior Art

In a conventional motor vehicle ignition system, a key operated lock is used to actuate the ignition switch. Closure of the switch connects battery power to essential ignition system components such as the ignition coil and the distributor. In the "start" position, battery power also is supplied to the engine's starter. The security of such an ignition system depends on the integrity of the lock, and the degree to which the mechanical installation can prevent tampering or "hot-wiring".

A major weakness in conventional ignition systems is that the wire carrying power from the battery to the ignition coil goes by way of the ignition switch. Direct shorting of the switch contacts is all that is required to start and run the engine. Alternatively, the battery can be directly hot-wired to the ignition system components under the hood. Security is poor.

In the past, the usual approach to improving security has been to enclose the critical interconnections and components in rigid housings. At least one automobile manufacturer locates the ignition coil on the fire wall between the engine and the dashboard, and provides a unitary armored cable from the ignition coil housing to the key switch assembly. Since power must be supplied to the ignition coil to start the engine, "hot-wiring" can only be accomplished by physically destroying the armored cable assembly. While this can be done with the appropriate tools, it is sufficiently difficult so as to discourage a would-be thief who is anxious to accomplish the job quickly.

The difficulty with this prior art approach is that the cost of such armored assemblies is high, and their use complicates normal maintenance. For example, in the system just described if a wire within the ignition coil should break, the entire armored cable assembly must be taken out to permit removal and disassembly of the ignition coil. Replacement ignition coils are only sold as a unit with the armored cable attached.

An object of the present invention is to provide a secure ignition system for a motor vehicle which does not depend on extensive mechanical armoring to prevent theft or "hot-wiring". Another object is to provide a secure ignition system which utilizes an electrical code transmission device, preferably an integrated circuit chip contained in the ignition switch assembly, to transmit an encoded signal to a receiver/decoder associated with the essential ignition system components. Receipt of this signal causes the receiver/decoder to effectuate a necessary electrical connection to the ignition system component, thereby enabling engine operation.

"Hot-wiring" at the ignition switch is prevented since shorting of the leads to the switch and transmitter assembly will not cause transmission of the necessary code, and hence will not result in engine ignition. By enclosing the receiver/decoder and the circuitry used to effectuate the necessary ignition system connection in a small tamperproof housing, "hot-wiring" at the ignition coil or distributor likewise is prevented. The inventive system may be used in conjunction with a pushbutton type electronic combination lock in place of a key-operated lock.

The inventive encoded control systems also are useful for remote control of power outlets, lighting fixtures and other devices in a building electrical system. In a conventional household or office electrical installation, the switches normally are mounted in the walls and permanently wired to associated light fixtures, outlets, and other electrical appliances. Such systems afford little or no flexibility. For example, switches to control overhead lights usually are mounted on the wall next to a door. This is convenient to turn on the lights when entering the room, but may be inconvenient otherwise. For example, in a bedroom it necessitates getting out of bed to turn off the light.

Some flexibility is afforded by providing a pair of single-pole, double-throw switches in separate locations to control the same light or outlet. Typically this is done in a stairway, with switches located at the top and bottom of the stairs. But even with this arrangement, the switch locations are fixed and cannot be moved without major rewiring and structural relocation of the switches in the walls.

A further object of the present invention is to provide an electrical control system in which the switch location is completely flexible. The switches, dimmers and the like are not wall mounted, but are situated in a portable controller or switch box which may be moved to any desired location. Each controlled light fixture, outlet or other device has associated with it a control circuit that responds to an encoded signal transmitted from the controller via the electrical distribution system. When a controller switch is actuated, the transmitted signal is recognized only by the intended control circuit, and effectuates turn-on, turn-off, dimming or other control of the associated electrical device.

With this arrangement, the controller may be plugged into any outlet in the common electrical distribution system. When furniture is moved, the controller also can be moved. Thus in a bedroom, if the bed is relocated, the light switches readily can be positioned next to the new bed location. Alternatively, the controller may be moved from one room to another to remotely control the lights in either of these, or yet another room.

SUMMARY OF THE INVENTION

These and other objectives are acheived by providing electrical control systems in which actuation of a switch or other control member causes an encoder/transmitter to generate a unique, encoded signal. At the controlled device, this signal is processed by a receiver/decoder that compares the signal code to a "recognition" code unique to the specific receiver. If the codes are identical, a power switch or other control circuit is enabled so as to effectuate the intended control function.

In motor vehicle applications, a secure ignition system is acheived by locating the encoder/transmitter in the key switch assembly housing, and by locating the receiver/decoder adjacent an essential ignition system component. When the ignition switch is closed, a unique code is transmitted which causes the receiver/decoder to effectuate a necessary electrical connection to that ignition system component. Security is acheived since (a) the shorting of the wires to the ignition switch and transmitter assembly will not cause transmission of the necessary code, (b) effectuating the necessary electrical connection cannot be accomplished without tampering with the receiver/decoder housing, and (c) insertion of a signal onto the line, as from a random signal generator, will not actuate the receiver/decoder without specific knowledge of the code that is unique to this particular motor vehicle.

In household and other building applications, the receiver/decoder associated with each controlled outlet, lighting fixture or the like has its own unique recognition code. In the controller, each separate switch, dimmer or other control member causes an associated encoder/transmitter to generate a code corresponding to that unique recognition code of the device to be controlled. This code is transmitted over the electrical distribution system to all of the receiver/decoders, but is recognized only by the one associated with the device being controlled.

Advantageously the encoded signals from the controller are transmitted in such a manner that the controller may be moved from place to place. For example, the controller may contain an rf carrier source and means for modulating that carrier with the encoded signals. The resultant modulated rf carrier then may be capacitively coupled to the electrical distribution system via a line and plug from the controller itself. With this arrangement, the controller can be moved from place to place and merely plugged into the nearest electrical outlet.

BRIEF DESCRIPTION OF THE DRAWINGS

A detailed description of the invention will be made with reference to the accompanying drawings wherein like numberals designate corresponding parts in the several figures.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Operational characteristics attributed to forms of the invention first described also shall be attributed to forms later described, unless such characteristics obviously are inapplicable or unless specific exception is made.

Figure 1:
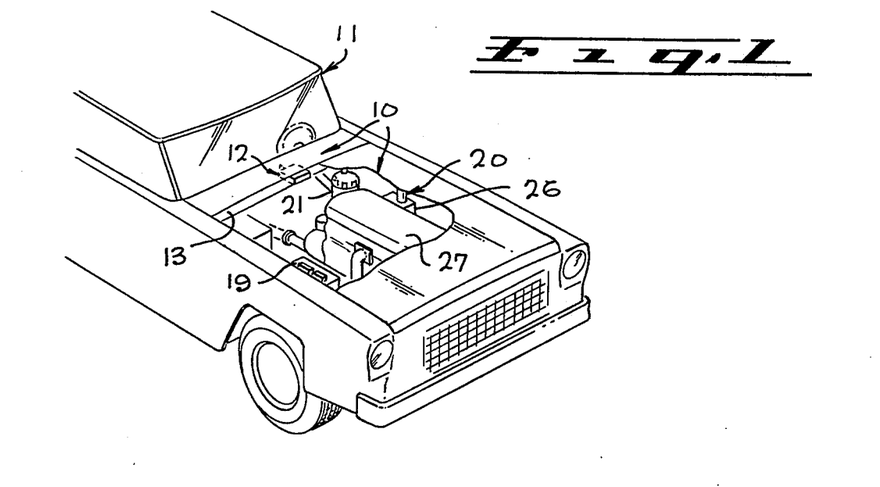
FIGS. 1 and 1A are pictorial views of the inventive secure ignition system for a motor vehicle.

In FIG. 1, the inventive secure motor vehicle ignition system 10 is installed in an automobile 11. The key-operated ignition switch assembly 12 (FIG. 1A) is mounted on the dashboard 13 by means of a nut 14. The assembly 12 includes a conventional tumbler lock 15 which, when rotated by a key 16, closes a switch 17 contained within a tamperproof housing 18 that is an integral part of the assembly 12.

Figure 1A:
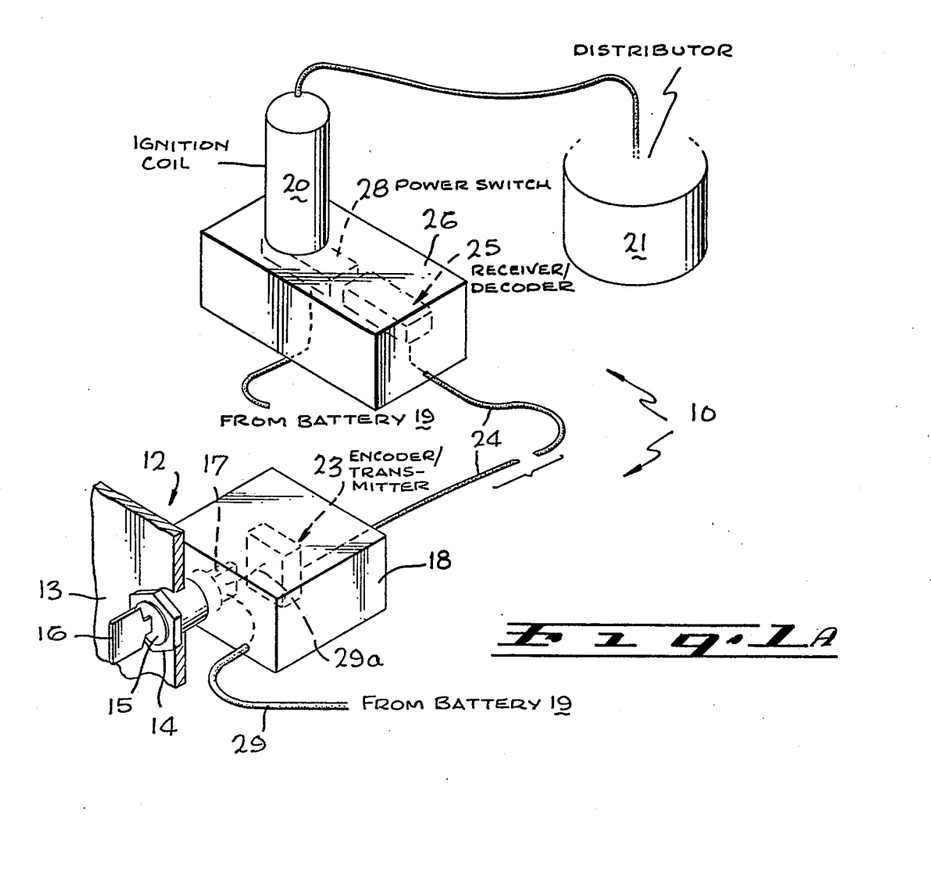

Unlike a conventional ignition system, the key-switch 17 does not directly connect power from the automobile battery 19 to the engine electrical components such as the ignition coil 20 and the distributor 21. Rather, in accorandance with the present invention, the switch 17 actuates an encoder/transmitter 23 contained within the housing 18. This device 23 transmits a unique code via a line 24 to a receiver/decoder 25 contained in a rigid housing 26 that is mounted to the vehicle engine 27. Upon receipt of the correctly encoded signal from the transmitter 23, the receiver/decoder 25 actuates a power switch 28, also contained in the housing 26, to connect electrical power from the battery 19 to the ignition coil 20. The coil 20 itself is mounted on the tamperproof housing 26.

From the driver's point of view, operation of the inventive ignition system 10 is exactly as in a conventional automobile. That is, when the key 16 is turned, power is connected to the ignition coil 20 and the engine operates normally. From a security point of view, however, the operation is quite different. First, hot wiring of the ignition switch assembly is impossible. To short out the switch 17 would require physical entry into the housing 18, which preferably is sufficiently solid so as to prevent such tampering. If the wire 29 leading from the battery 19 to the housing 18 is shorted to the wire 24, electrical actuation will not result. This will merely apply a continuous dc voltage to the input of the receiver/decoder 25, and that device will not actuate the power switch 28 in the absence of the proper encoded signal. Preferably, the housing 26 itself is sufficiently rigid so as to prevent tampering or "hot-wiring" of the power switch 28. In other words, there is no way of connecting the battery 19 to the primary of the ignition coil 20 except by forcibly breaking into the housing 26 and shorting out the power switch 28.

A would-be thief of some technical bent may try to actuate the receiver/decoder 25 by connecting a signal generator to the line 24 so as to simulate the encoder/transmitter 23. However, even if the data format on the line 24 were known, the thief would not know the specific code that is produced by the encoder/transmitter 23, since advantageously that code is unique to each vehicle 11. If the wrong code is received by the decoder 25, the power switch 28 will not be actuated. Furthermore, if the code is of sufficient length (i.e., number of binary bits), then even if a random binary number generator were connected to the line 24, the probability of generating the specific code for this vehicle 11 is extremely low. In this manner, high security is acheived.

Figure 2:
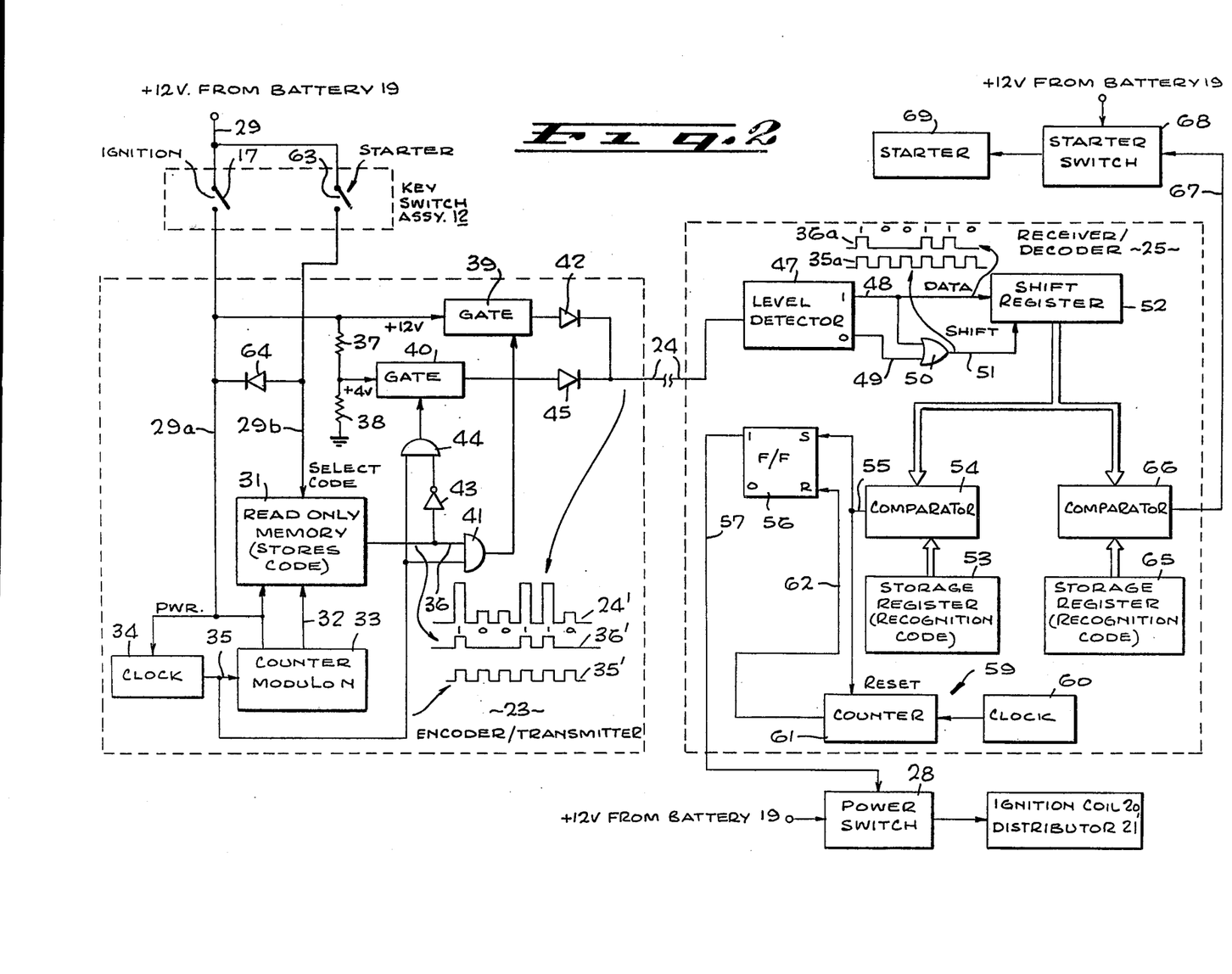
FIG. 2 is an electrical block diagram of the secure ignition system of FIG. 1, showing both the encoder/transmitter and receiver/decoder components.

Typical circuitry for the encoder/transmitter 23 and for the receiver/decoder 25 is shown in FIG. 2. However, the invention is by no means limited to this particular circuitry embodiment, and any alternative means for producing an encoded signal may be used as the transmitter 23 in conjunction with any corresponding decoder circuitry in the receiver 25. Advantageously, but not necessarily, the encoder/transmitter 23 may be implemented using an integrated circuit chip of small size, so that the housing 18 need be no larger than the switch housings currently in use. Similarly, the receiver/decoder 25 may be implemented using integrated circuit technology.

In the embodiment of FIG. 2, the code is stored in a read only memory 31, and preferably consists of N binary bits. For example, this code may be "1 0 0 1 1 0". Advantageously, each bit of the code is stored in a single storage location of the memory 31 and is accessed therefrom as the address of the corresponding location is provided to the memory 31 on a line 32 from a counter 33.

When the key switch 17 is closed, battery power is supplied to the memory 31, to the counter 33 and to a clock 34 via a line 29a. Clock pulses are supplied via a line 35 to increment the counter 33. In turn, the counter output on the line 32 sequentially accesses the stored code from the memory 31 and provides this code 36' on a line 36.

The code is converted to a bi-level format for transmission on the line 24 by circuitry including a voltage divider consisting of the resistors 37, 38 and a pair of gates 39, 40. When a binary "1" is present on the line 36 concurrently with a clock pulse 35', an AND-gate 41 enables the gate 39 to supply a +12 volt signal from the line 29a via a diode 42 to the line 24. When a binary "0" is present on the line 36, a lower level signal of say +4 volts is provided to the line 24. The voltage divider 37, 38 supplies a constant +4 volt signal to the gate 40. The low or binary "0" signal on the line 36 provides a high output from an inverter 43 that provides one input to an AND-gate 44 which is enabled by the clock pulses 35'. The resultant output from the AND-gate 44 enables the gate 40 to supply the +4 level via a diode 45 to the line 24 each time a binary "0" is read from the memory 31. The resultant bi-level encoded signal present on the line 24 is illustrated by the wave shape 24' in FIG. 2. This signal format has the advantage of permitting easy recovery of the clock pulses at the receiver 25, and thus simplifies synchronization in the system.

In the receiver 25, a level detector 47 provides a high output on a line 48 whenever a +12 volt signal is detected on the line 24 indicating the presence of a binary "1". Similarly, the detector 47 provides a high signal on a line 49 whenever a +4 volt signal is detected indicating a binary "0". By combining these signals on the lines 48 and 49 in an OR-gate 50, a clock pulse train 35a is recovered on a line 51 that is exactly synchronous with the clock pulses 35' from the clock 34. These pulses 35a are used to shift a shift register 52 that receives the incoming data stream from the line 48. As indicated by the wave shape 36a, this data stream corresponds to the code 36' read out of the memory 31.

A code identical to that contained in the read only memory 31 is stored in a register 53. This recognition is compared with the contents of the shift register 52 by a comparator 54. If the correct code is received from the line 24, the comparator 54 will provide a high signal on a line 55 that sets a flip flop 56 to the "1" state. As a result, an enable signal will be provided from the flip flop "1" output via a line 57 to turn on the power switch 28. This will connect power from the battery 19 to the ignition coil 20 and to the distributor 21. Of course, if an incorrect code is received, no output will be provided from the comparator 54, the flip flop will remain in the "0" state, and the power switch 28 will remain off.

Note that in the embodiment of FIG. 2, power is supplied to the memory 31, the counter 33 and the clock 34 for as long as the key switch 17 remains closed. Therefore, since the counter 33 if of module N and hence recycles repetitively, the code signal 24' will be transmitted down the line 24 for as long as the switch 17 remains closed. As a result, in the receiver 25, the comparator 54 will produce a sequential set of pulses on the line 55. These pulses will occur once for each complete transmission of the code for as long as the key switch 17 is actuated. A timing circuit 59 is used to reset the flip flop 56, and thereby turn off the power switch 28, after the last transmission of the code from the transmitter 23.

To this end, the circuit 59 includes a clock 60 and a counter 61 that cooperate to produce a reset pulse on a line 62 after a time duration slightly greater than that required to transmit the entire stored code. The counter 61 is reset by occurence of the pulse on the line 55. Therefore, if the code 24' were transmitted only once, the single resultant pulse on the line 55 would set the flip flop 56 to the "1" state and also reset the counter 61 to zero. A short time later, the output from the counter 61 will reset the flip flop 56 to the "0" state thereby terminating the signal on the line 57 and turning off the power switch 28. However, if the code 24a is transmitted once again before the counter 61 provides the output pulse on the line 62, the resultant signal on the line 55 will reset the counter 61 and start a new time period. As a result, the flip flop 56 will remain set to "1" and the power switch 28 will remain on. With this arrangement, the switch 28 in fact will remain on as long as the key switch 17 is held closed. Shortly after the switch 17 is opened, the power switch 28 will turn off.

The ignition switch assembly 12 also can be used to control the engine starter. In one implementation (not shown), the switch 17 may have a second set of contacts that enable another encoder/transmitter (not shown) identical to the device 23 and also contained in the housing 18. The output from that transmitter then may be supplied via another line like the line 24 to another receiver/decoder identical to the receiver 25. That receiver may be used to control another power switch, analogous to the switch 28, that connects battery power to the engine starter.

An alternative implementation is shown in FIG. 2. Therein, the encoder/transmitter 23 stores a second code in the memory 31 which is selectively accessed when the starter switch contacts 63 of the switch assembly 12 are closed. This provides power to the clock 34, counter 33 and memory 31 via a line 29b, a diode 64 and the line 29a. The signal on the line 29b also conditions the memory 31 for readout of the starter-indicating code.

The receiver/decoder 25 has a second storage register 65 containing the corresponding starter recognition code, together with a second comparator 66 for comparing that code with the contents of the shift register 52. When the second "starter" code is present, the resultant high output signal from the comparator 66 present on a line 67, actuates a starter switch 68 which then connects power from the battery 19 to the starter 69.

Although not illustrated, time-based codes could be employed in connection with the present invention. For example, the encoder/transmitter 23 could generate a unique code consisting of a sequence of pulses of different, controlled time duration. A quartz crystal-controlled oscillator, not unlike that employed in a digital electronic watch, could be used as the time standard, together with appropriate circuitry for generating the time-based code. A similar time standard and comparison circuitry could be used in the receiver/decoder 25 to recognize the specific time-encoded signal and provide the control signal to the power switch 28.

Figure 3:
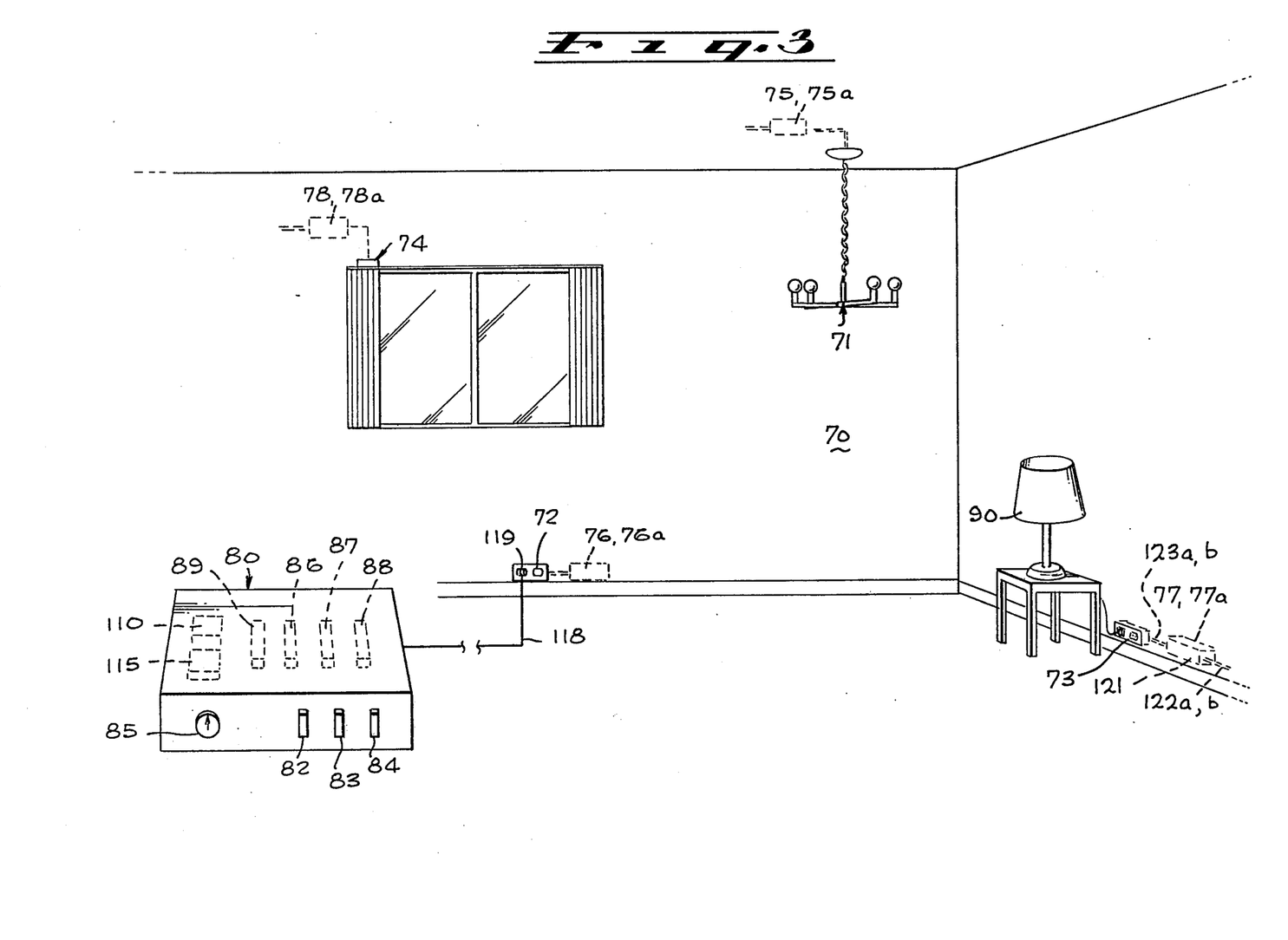
FIG. 3 is a pictorial view of a typical installation of the inventive household encoded electrical control system.

The household application of an encoded electrical control system is illustrated in FIG. 3. Referring thereto, a typical room 70 may have a chandelier 71, two or more electrical outlets 72, 73 and other electrical appliances such as a mechanized drapery opener 74. In accordance with the present invention, each of the fixtures 71, 74 and outlets 72, 73 is provided with a respective receiver/decoder 75-78 and associated electronic switch 75a-78a. A single, portable controller 80 provides individual remote control for each of the fixtures 71, 74 and outlets 72, 73. The controller 80 may be moved to any desirable location, and can be plugged into either outlet 72 or 73, or into a like outlet in another room that is connected to the same electrical distribution system as the room 70.

In the embodiment of FIG. 3, the controller 80 has three control switches 82, 83, 84 intended respectively to control the outlets 72, 73 and the drapery mechanism 74. In addition, it has a dimmer knob 85 intended for remote control of the chandelier 71.

Associated with each of the controls 82-85 is a respective encoder/transmitter 86-89 each storing a unique code corresponding to the like code contained in the respective receivers 76, 77, 78 and 75. When e.g. the switch 83 is closed, the transmitter 87 modulates an rf carrier that is transmitted via the room electrical distribution system to all the receivers 75-78. However, the unique transmitted code corresponds only to that of the receiver 77, so that only the switch 77a is actuated. As a result, ac power is supplied to the outlet 73, thereby turning on any appliance (such as the lamp 90) that is plugged into that outlet. Similarly, if the dimmer knob 85 is rotated, the corresponding transmitter 89 sends out a uniquely coded signal that is recognized only by the receiver 75. This alters the duty cycle of the associated switch 75a so as to change the light intensity from the chandelier 71.

Figure 4:
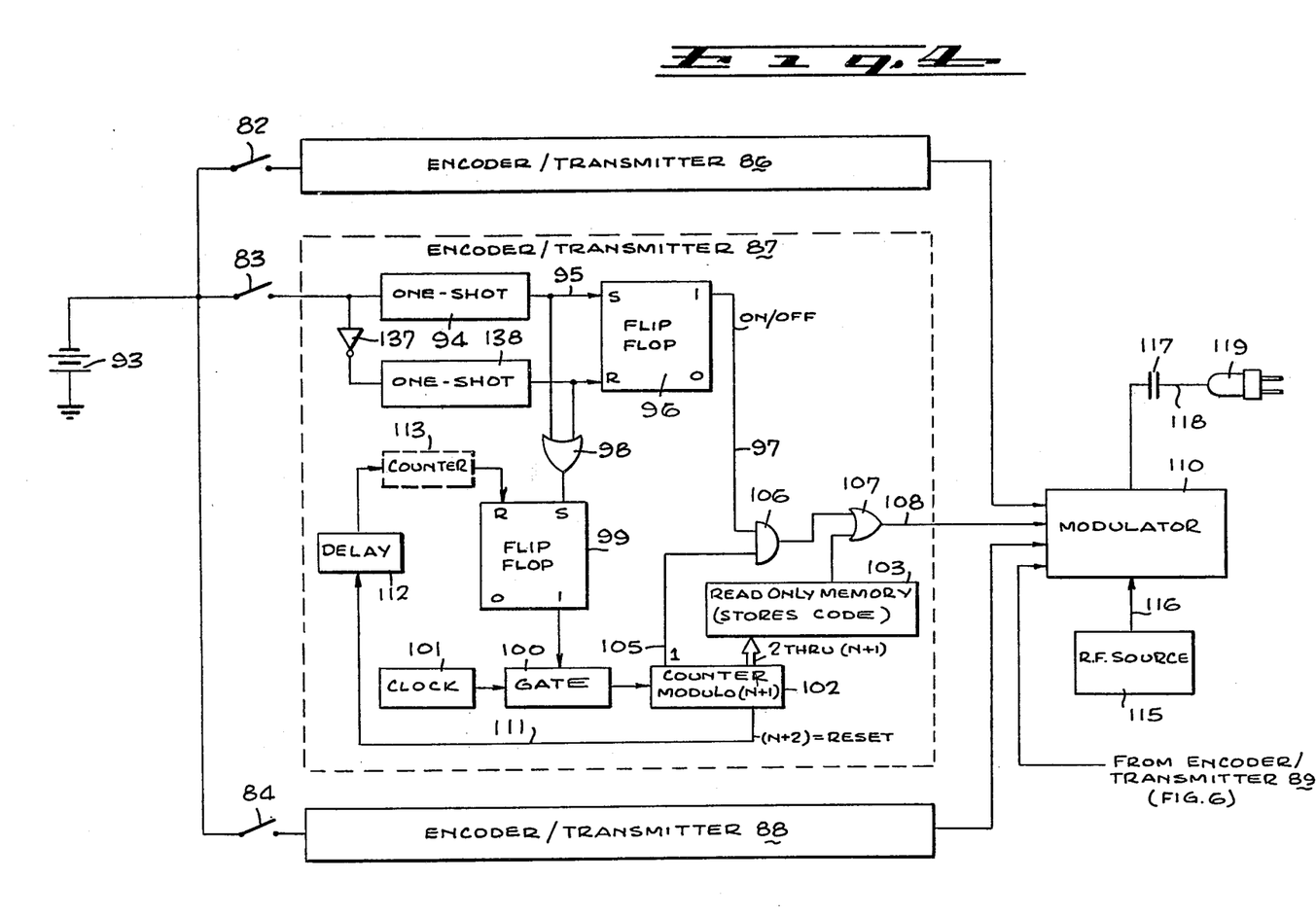
FIG. 4 is an electrical block diagram of the controller and associated encoder/transmitter circuitry used in the household electrical control system of FIG. 3.

Illustrative circuitry for the controller 80 is shown in FIG. 4. Three identical encoder/transmitters 86-88 are employed, differing only in that each stores a different code. When the switch 83 is closed, voltage from a battery 93 triggers a monostable multivibrator ("one-shot") 94 that produces a pulse on a line 95 which triggers a flip flop 96 to the "1" state. As a result, a high signal is provided on an output line 97 which designates that the switch 83 is "on". The pulse on the line 95 also is supplied via an OR-gate 98 to the set input of a flip flop 99. The resultant high "1" output of the flip flop 99 enables a gate 100 to feed clock pulses from a clock 101 to a counter 102 of modulo (N+1). The resultant incrementing of the counter 102 causes read out of the code stored in a read only memory 103.

The first clock pulse to reach the counter 102 sets the contents to 1 (base 10). A resultant counter 102 output on a line 105 enables an AND-gate 106 to pass the signal from the line 97 via an OR-gate 107 to an output line 108. This high signal, which is handled as an extra bit transmitted prior to the code, indicates that the switch 83 is closed.

Subsequent pulses from the clock 101 increment the counter 102 to counts of 2 through (N+1). At each such count, the corresponding code bit is read from the memory 103 and supplied via the OR-gate 107 to the line 108. In this manner, the "on/off bit" and the code from the encoder 87 are transmitted via the line 108 to a modulator 110 that is common to all of the encoder/transmitters 86-88 in the controller 80.

At the next, $(N+2)^{th}$ pulse from the clock 101, the counter 102 will reset to zero and will provide a reset pulse on a line 111. This pulse is slightly delayed in a delay circuit 112 and supplied to the reset input of the flip flop 99. This causes the flip flop 99 to go to the "0" state, thereby disabling the gate 100 and causing the counter 102 to remain set at zero. As a result, code transmission is inhibited. In other words, the on/off bit and the code are transmitted only once. Alternatively, the pulse from the line 111 may be used to increment an optional counter 113 that controls how many times the code is transmitted. For example, it may be desireable to transmit the code two or three times to insure correct reception and decoding in the event that noise on the electrical distribution lines interferes with correct decoding of the code when transmitted the first time. In this instance, when the counter 113 reaches a count equal to the desired number of transmissions of the code, an output signal is provided to reset the flip flop 99.

The controller 80 is provided with an rf source 115 that provides an rf carrier on a line 116. This carrier is modulated by the on/off bit and the code from the transmitter 87 by the modulator 110. The resultant modulated rf signal is transmitted via a capacitor 117 and a line 118 to a plug 119 that can be inserted into any electrical outlet in the room 70 or any nearby room.

Figure 5:
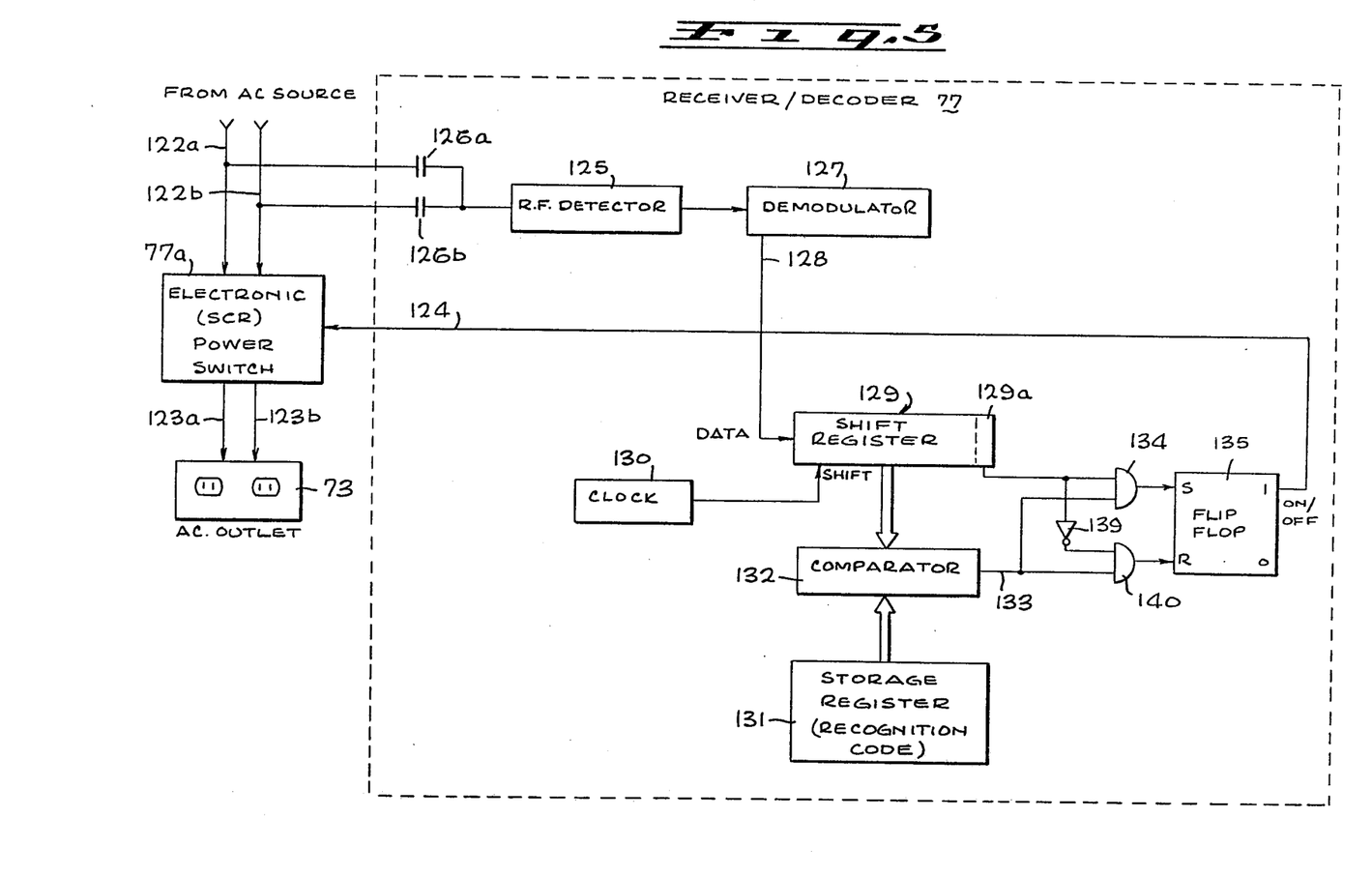
FIG. 5 is an electrical block diagram of the receiver/decoder and load control switch components of the household electrical control system of FIG. 3.

A typical receiver/decoder 77 is shown in FIG. 5. Advantageously the receiver 77 and its associated electronic switch 77a are mounted in a common housing 121 (FIG. 3) adjacent the associated ac outlet 73. The power lines 122a, 122b from the power distribution box supplying the room 70 terminate at the electronic switch 77 which in turn is connected to the outlet 73 by means of lines 123a, 123b. The switch 77a may comprise a relay or any electronic switch, known per se, employing a silicon controlled rectifier (SCR) or other semiconductor switching device. The switch 77a is actuated in response to a high control signal on a line 124 that is provided when the receiver 77 detects the code transmitted from the encoder/transmitter 87.

To this end, the receiver 77 includes a conventional rf detector 125 that is connected to the power lines 122a, 122b by capacitors 126a, 126b. The detector is tuned to the frequency of the rf source 115. The detector output is supplied to a demodulator 127 that recovers the data from the detected rf signal. Of course, the demodulator 127 is of the same character of the modulator 110. For example, if the modulator 110 accomplishes frequency shift keying of the carrier on the line 116, the demodulator 127 responds to such frequency shift keyed signal and provides on a line 128 a data signal corresponding to that supplied on the line 108 in the transmitter 87. This signal is supplied to the data input of a shift register 129 that is shifted by clock pulses from a clock 130 which operates in synchronism with the clock 101.

After receipt of (N+1) bits, the "on/off bit" will be contained in the last shift register position 129a and the received code will be contained in the remaining positions of the shift register 129. This code is compared with the recognition code of the receiver 77 that is stored in a register 131 by a comparator 132. If the codes are identical, meaning that the signal is intended for this receiver 77, the comparator 132 provides a high output on a line 133 that enables an AND-gate 134. As a result, the "on/off bit" contained in the shift register position 129a is supplied via the AND-gate 134 to the set input of a flip flop 135. The "1" output of the flip flop 135 thus comprises an on/off signal on the line 124 that is high if the received "on/off bit" itself is high. This signal on the line 124 actuates the electronic switch 77 to turn on power to the outlet 73. In this manner, closure of the switch 83 in the controller 80 accomplishes remote turn-on of the outlet 73. Of course, the modulated rf signal transmitted by the controller 80 also is received by the other receivers 75, 76 and 78. However, the transmitted code is not the same as the recognition code stored in those respective receivers, so that no control function is accomplished therein.

When the switch 83 is opened, the output on an inverter 137 (FIG. 4) triggers a monostable multivibrator 138 which resets the flip flop 96 to the "0" state so that the on/off signal on the line 97 goes low. The output from the "one-shot" 138 also is supplied via the OR-gate 98 to the set input of the flip flop 99. This initiates another transmission cycle during which the "on/off bit" and the code stored in the memory 103 are transmitted via the line 108 to the modulator 110. In this instance, however, the "on/off bit" is low (binary "0").

When this signal is received at the receiver/decoder 77, the shift register location 129a will store a "0" bit so that the output of an inverter 139 will be high. In this instance, the high comparator output on the line 133 will enable an AND-gate 140 that supplies the output of the inverter 139 to the reset input of the flip flop 135. This resets the flip flop to the "0" state causing the on/off signal on the line 124 to go low. This causes turn off of the electronic switch 77a so that power to the outlet 73 is shut off.

Although not illustrated, the clocks 101 and 130 may be synchronized to some multiple of the ac line frequency. Since the controller 80 and the receiver 77 both are connected to a common ac power distribution system, the ac line frequency can be used as a common frequency reference source for these clocks.

Figure 6:
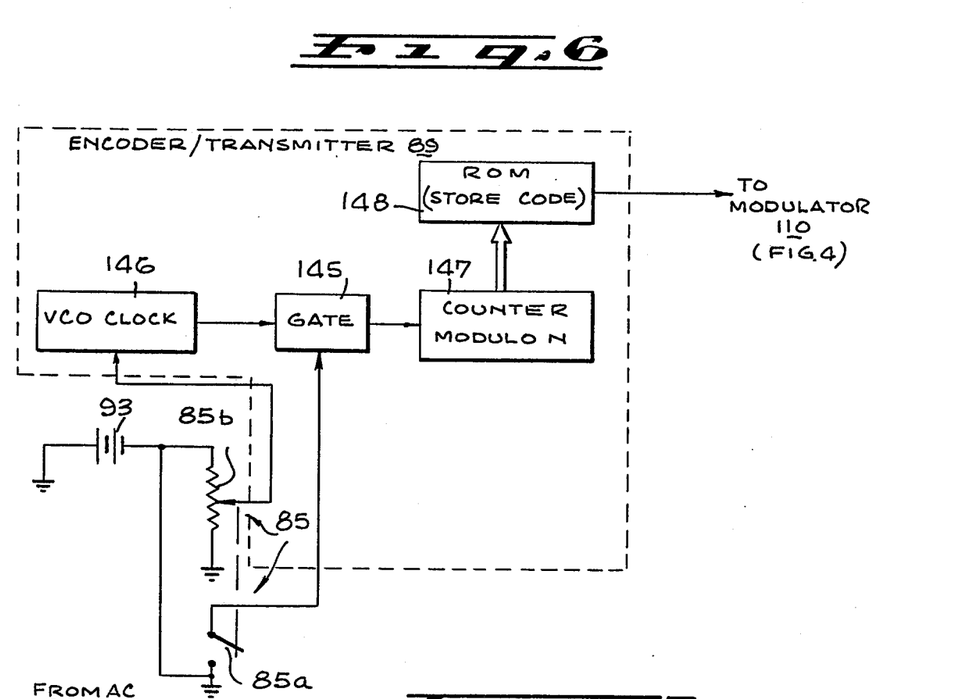
FIGS. 6 and 7 are electrical block diagrams of alternative encoder/transmitter and receiver/decoder circuitry for providing remote dimming control in an encoded household electrical control system like that of FIG. 3.
Figure 7:
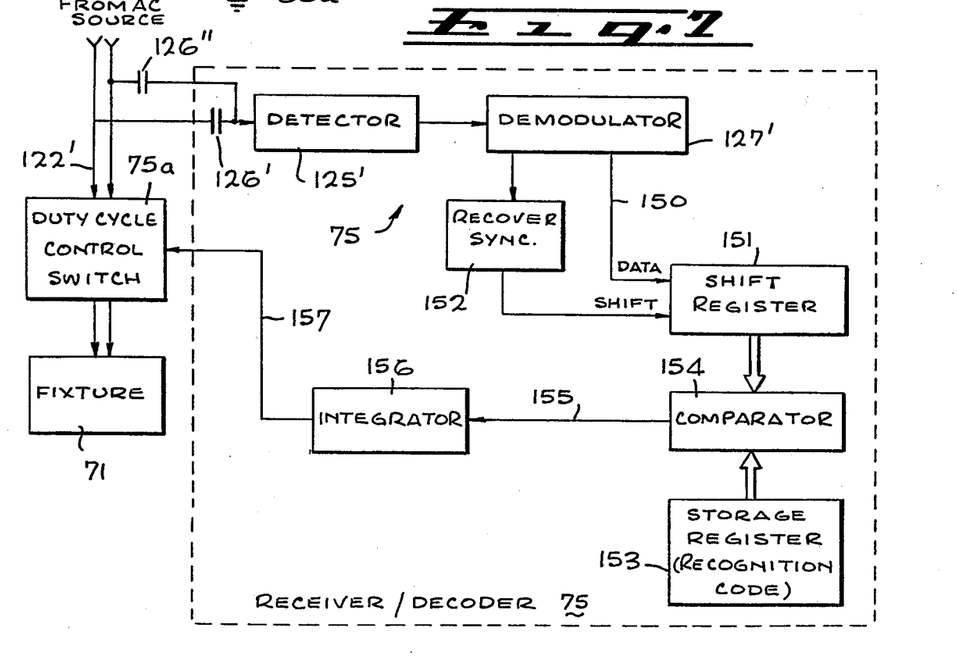

The encoder/transmitter 89 of FIG. 6 and the associated receiver/decoder 75 of FIG. 7 may be used to accomplish remote dimming control of the fixture 71. Code transmission is initiated when the dimmer knob 85 is rotated slightly so as to cause closure of a switch 85a. The extent of dimming is controlled by a potentiometer 85b which is ganged to the switch 85a and controlled by the knob 85.

Closure of the switch 85a supplies a voltage from the battery 93 to enable a gate 145 to transmit clock pulses from a voltage controlled oscillator 146 to a counter 147. The clock pulse rate is determined by the setting of the potentiometer 85a. The counter 147 controls read out of the stored code from a read only memory 148. The code is supplied via the line 108 to the modulator 110 described above.

The counter 147 is of modulo N where N is the number of bits in the code stored in the memory 148. With this arrangement, when switch 85a is closed, the code will be repetitively read from the memory 148 and transmitted to the line from the modulator 110 at a rate that is determined by the setting of the potentiometer 85a.

At the receiver 75 the incoming rf signal is coupled via a capacitor 126' to an rf detector 125'. The signal is demodulated by a demodulator 127' that supplies a data output via a line 150 to a shift register 151 of N-bit length. The register 151 is shifted in synchronism with the incoming data rate in response to a circuit 152 which recovers a sync signal from the demodulated data.

The identifying code of the receiver 75 is stored in a register 153. The contents of the shift register 151 is compared with this code by a comparator 154. If the incoming signal is intended for this receiver 75, an equal comparison will result each time the complete code is received from the transmitter 89. Thus the comparator 154 will provide an output pulse on a line 155 each time that the code is received. Since the rate at which the code is received depends on the setting of the VCO clock 146, the rate at which the comparison pulses occur on the line 155 will be indicative of the setting of the dimmer knob 85. These pulses in turn are integrated by an integrator 156 to provide a voltage on a line 157 that is proportional to the pulse rate on the line 155. In other words, the voltage on the line 157 will be proportional to the setting of the potentiometer 85 in the transmitter 89.

Advantageously the control switch 75 which controls the power supplied from the ac line 122' to the fixture 71 is the type which adjusts the duty cycle of the supplied power in response to a dc control voltage. Such circuits are known per se and often use a ramp voltage to control the on-time or duty cycle of a silicon controlled rectifier connected in the ac path. The voltage on the line 157 is used to control this duty cycle. As a result, the duty cycle of the ac signal reaching the fixture 71, and hence the brightness of the chandelier, will be controlled remotely by the dimmer knob.

Figure 8:
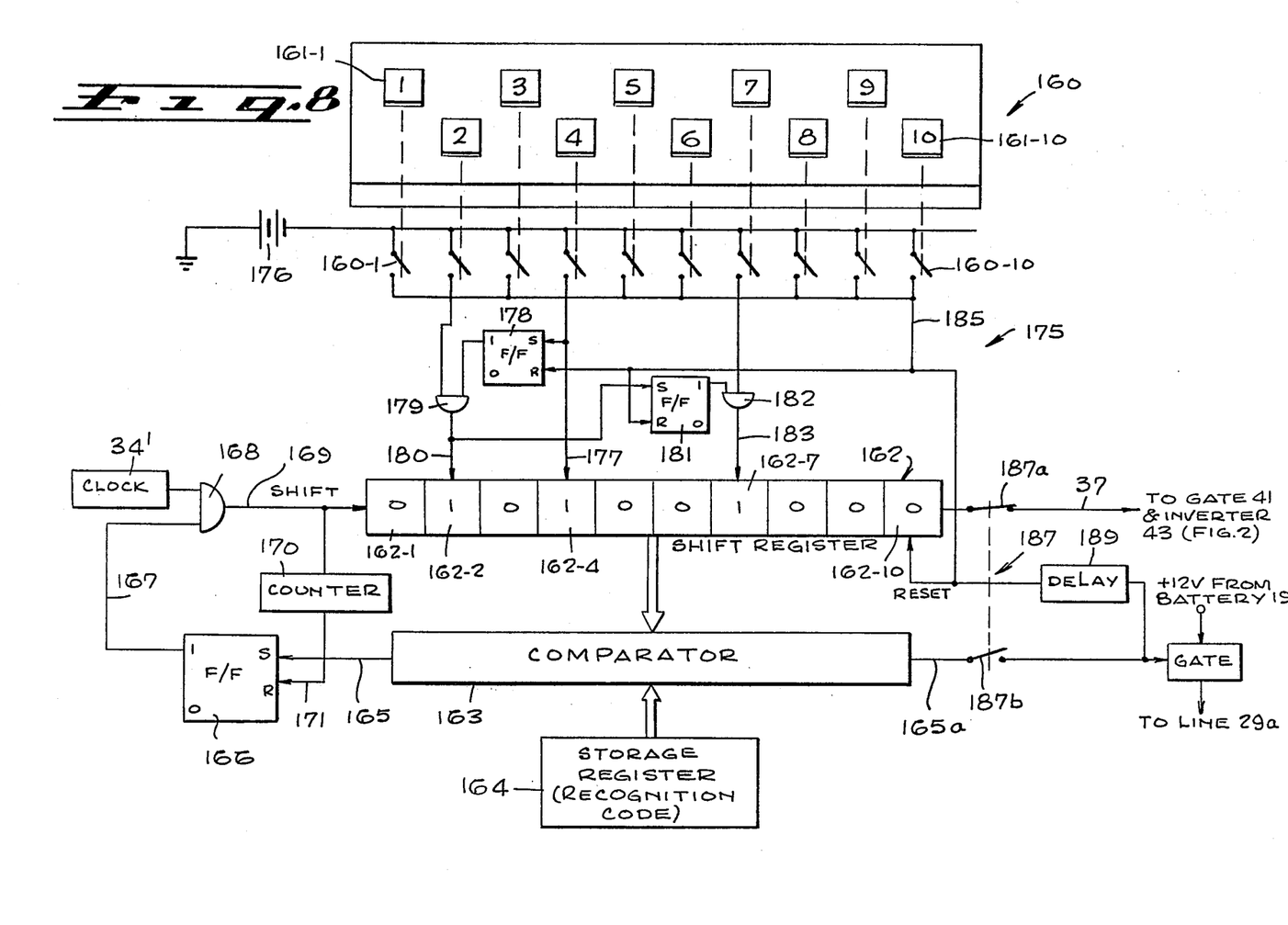
FIG. 8 is an electrical block diagram of an alternative embodiment of the secure ignition system of FIG. 1, utilizing code selection switches for code entry or transmission actuation.

FIG. 8 shows an alternative embodiment of the secure ignition system for a motor vehicle, wherein an electronic combination lock is used in place of the keylock ignition switch, or in which the correct code first must be entered by the driver using a set of code selection switches 160.

In one mode of operation, the proper subset of pushbuttons 161-1 through 161-10 must be depressed in the correct order so as to enter the correct code into a shift register 162. This correct code then is transmitted to the receiver/decoder 25 (FIG. 2) to actuate the engine as described above. The presence of the correct code in the register 162 is ascertained by a comparator 163 which compares these contents with a recognition code contained in a storage register 164. In embodiments wherein the contents of the shift register 162 is transmitted to the receiver/decoder 25, the recognition code stored in the register 164 will be the same as that stored in the register 53 of the receiver/decoder 25.

Upon determination that the correct code has been entered via the selection switches 160, the comparator 163 will provide a high output on a line 165 to set a flip flop 166 to the "1" state. The resultant high signal on a line 167 will enable an AND-gate 168 to transmit clock pulses from a clock 34' to the shift input 169 of the register 162. This will cause the code stored therein to be read out serially onto the line 36. From there the code is converted to bi-level format by the circuitry shown in FIG. 2 for transmission to the receiver/decoder 25.

Code transmission is terminated by resetting the flip flop 166, and thereby disabling the AND-gate 168, after the code has been read out of the shift register 162. To this end, the clock pulses fed to the shift input 169 also are supplied to a counter 170. When the counter 170 reaches a count equal to the number of bits in the code stored in the shift register 162, an output is provided on a line 171 to reset the flip flop 166 and thereby terminate code transmission.

Illustrative circuitry 175 indicates the manner in which the switches 160-1 through 160-10 may be connected for code selection and entry into the shift register 162. In the typical embodiment shown, the pushbuttons 161-4, 161-2 and 161-7 must be depressed in that order to enter the correct code. In this embodiment, the correct code than has a binary "1" in each of shift register positions 162-2, 162-4 and 162-7, and has a binary "0" in each of the other shift register 162 positions.

If the correct pushbutton 161-4 first is depressed, the switch 160-4 is closed so as to connect a voltage from a battery 176 via a line 177 to the register storage position 162-4, thereby causing a binary "1" to be entered into this location. The signal on the line 177 also sets a flip flop 178 to the "1" state so as to enable an AND-gate 179. If the correct pushbutton 162-2 next is depressed, the AND-gate 179 receives a second input and thus provides a high output on a line 180 that causes a "1" to be entered into the shift register position 162-2. The high signal on the line 180 also sets a flip flop 181 to the "1" state so as to enable an AND-gate 182. If the correct pushbutton 161-7 next is depressed, a second input is provided to the AND-gate 182 which in turn provides a high output on a line 183 that enters a binary "1" into the register position 162-7. The correct code now is contained in the shift register 162.

The cooperation of the flip flops 178, 181 and the AND-gates 179, 182 insure that the pushbuttons 161-4, 161-2 and 161-7 must be depressed in that order to accomplish correct code entry. An appropriate mechanical or electrical interlock (known per se and not shown) may be used to prevent code entry by simultaneous depression of these three pushbuttons. The switches associated with the remaining pushbuttons (e.g., the switches 160-1, 160-3, 160-5, etc.) all are connected via a common line 185 to the reset input of the shift register 162 and to the reset inputs of the flip flops 178 and 181. Thus if any of these incorrect pushbuttons are depressed, the shift register 162 contents will be set to zero, and the flip flops 178 and 181 will be reset so that correct code entry is not accomplished. Of course, this pushbutton code selection circuitry is illustrative only, and the invention is by no means limited to the particular embodiment shown.

The pushbutton assembly 160 may be used solely to replace the key-lock operated ignition switch 17 (FIG. 2), and not for entry of the code transmitted to the receiver/decoder 25. To this end, a ganged switch 187 is actuated so as to open the normally closed contacts 187a and to close the normally open contacts 187b. As a result, when the correct code has been entered into the shift register 162, the high output of the comparator 163 on a line 165a will be supplied via the closed switch 187b to a gate 188. This gate 188 replaces the switch 17 (FIG. 2) and connects the voltage from the battery 19 to the line 29a. The encoder/transmitter 23 then operates as described above to transmit the code stored in the memory 31. This in turn is recognized by the receiver/decoder 25 and actuates the power switch 28. Of course, in this embodiment the recognition code stored in the register 164 (FIG. 8) need not be the same as that contained in the memory 31 and the storage register 53, and preferably is different. To actuate the engine, the user must select via the switches 160 that code which is stored in the register 164. The signal on the line 165a from the comparator 163 also is supplied via a delay circuit 169 to the reset terminal of the shift register 162 so as to reset the contents thereof to zero after correct code recognition has been completed.

Intending to claim all novel, useful and unobvious features shown or described, the applicant claims:

1. An electrical control system for remote control of devices powered from a common electrical distribution system, comprising:

a controller containing one or more switches and associated encoder/transmitters each providing a different unique, encoded signal in response to actuation of a respective switch, transmission means for transmitting the encoded signals from said encoder/transmitters over said electrical distribution system, and respective receiver/decoder means associated with each device to be controlled, each receiver/decoder means being connected to receive the encoded signals transmitted over said distribution system and to effectuate control of said respective device in response to receipt only of the unique code associated with that specific receiver/decoder means, and wherein in addition to said encoded signal said encoder/transmitter also transmits a plurality of data bits that specify the condition of the associated switch, and wherein each receiver/decoder means further includes means, responsive to receipt of said plurality of data bits, for modifying the control effectuated by said receiver/decoder means in response to the contents of said data bits, and wherein:

said plurality of data bits indicate the setting of a control member in said controller, and wherein:

said receiver/decoder means effectuates proportional control of the associated device in response to the contents of said data bits.

2. An encoded electrical control system for remote control of devices powered from a common electrical distribution system, comprising:

a controller including a switch and a control member, and an associated encoder/transmitter providing a unique, encoded signal in response to actuation of said switch, said encoder/transmitter providing said encoded signal repetitively at a repetition rate determined by the setting of said control member, transmission means for transmitting the encoded signals from said encoder/transmitter over said electrical distribution system, and respective receiver/decoder means associated with each device to be controlled, each receiver/decoder means being connected to receive the encoded signals transmitted over said distribution system and to effectuate control of said respective device in response to receipt only of the unique code associated with that specific receiver/decoder means, and wherein the associated receiver/decoder means effectuates control of the associated device in proportion to the repetition rate of said encoded signal.

3. An encoded electrical control system according to claim 2 wherein said encoder/transmitter comprises:

a memory (148) for storing a unique code of N bits, access means (146, 147) for accessing said code from said memory repetitively in bit serial format, at a read-out rate established by the setting of said control member (85b), wherein said transmission means comprises:

a RF signal source (115) and a modulator (110), connected to said memory and to said source, for modulating the RF signal from said source with the bit serial code that is repetitively accessed from said memory, and wherein said receiver/decoder means comprises:

a detector (125') and a demodulator (127') for recovering said repetitive serial format data from said RF signal, comparator means (151, 153, 154) for comparing the code represented by said recovered serial format data with a stored recognition code uniquely associated with that specific receiver/decoder means, and said comparator producing an output signal each time that equality is detected, said output signals thus occurring at a repetition rate corresponding to the repetitive access rate of said access means, integrator means (156), receiving said output signals from said comparator means, for producing a control signal proportional to the repetition rate thereof, said control signal thereby being proportional to the setting of said control member, and utilization means (71, 75a) controlled by said proportional control signal.

* * * * *